United States Patent
Kim et al.

(10) Patent No.: US 11,691,619 B2
(45) Date of Patent: *Jul. 4, 2023

(54) AUTOMATIC PARKING SYSTEM AND AUTOMATIC PARKING METHOD

(71) Applicants: Hyundai Motor Company, Seoul (KR); Kia Motors Corporation, Seoul (KR)

(72) Inventors: Yoon Soo Kim, Gyeonggi-do (KR); Joo Woong Yang, Seoul (KR); Dae Joong Yoon, Gyeonggi-do (KR); Seung Wook Park, Gyeonggi-do (KR); Jae Seob Choi, Gyeonggi-do (KR); Kyung Soo Ha, Gyeongsangbuk-do (KR); Min Byeong Lee, Gyeonggi-do (KR); Jin Ho Park, Gyeonggi-do (KR); In Yong Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 425 days.

This patent is subject to a terminal disclaimer.

(21) Appl. No.: 16/507,903

(22) Filed: Jul. 10, 2019

(65) Prior Publication Data

US 2019/0329761 A1 Oct. 31, 2019

Related U.S. Application Data

(63) Continuation of application No. 15/833,842, filed on Dec. 6, 2017, now Pat. No. 10,392,009, which is a (Continued)

(30) Foreign Application Priority Data

Aug. 12, 2015 (KR) .................. 10-2015-0114025

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/10* (2013.01); *B60W 10/18* (2013.01);
(Continued)

(58) Field of Classification Search
USPC ........................................... 701/41
See application file for complete search history.

(56) References Cited

U.S. PATENT DOCUMENTS 8,384,561 B2 2/2013 Kadowaki et al.
8,912,923 B2 12/2014 Barth et al.
(Continued)

FOREIGN PATENT DOCUMENTS

CN 105863351 A 8/2016
CN 106027749 A 10/2016
(Continued)

OTHER PUBLICATIONS

Office Action for Korean Patent Application No. 10-2016-0184300, dated Feb. 8, 2018, 22 pages, English translation.
(Continued)

*Primary Examiner* — Tyler D Paige
(74) *Attorney, Agent, or Firm* — Fox Rothschild LLP (57) ABSTRACT

An automatic parking system is provided. The automatic parking system includes a camera processor that acquires images around a subject vehicle, converts the acquired images into external images and synthesizes the external images. A sensor processor measured spaced distances between the subject vehicle and surrounding vehicles. A parking space recognizing unit periodically receives the
(Continued)

spaced distances and the external images and comparing the consecutive external images with the spaced distances using an image recognition technology to recognize parking areas. A controller calculates a moving path between a current position of the subject vehicle and an optimal parking area and operates the subject vehicle based on the moving path.

19 Claims, 9 Drawing Sheets

Related U.S. Application Data continuation-in-part of application No. 14/935,984, filed on Nov. 9, 2015, now Pat. No. 9,738,277.

(51) Int. Cl.

| | | |
|---|---|---|
| B60W 10/20 | (2006.01) | |
| G08G 1/16 | (2006.01) | |
| B60W 10/10 | (2012.01) | |
| B60W 10/18 | (2012.01) | |
| B60W 50/14 | (2020.01) | |
| B62D 15/02 | (2006.01) | |
| B60W 40/10 | (2012.01) | |

(52) U.S. Cl.
CPC ............ *B60W 10/20* (2013.01); *B60W 40/10* (2013.01); *B60W 50/14* (2013.01); *B62D 15/027* (2013.01); *B62D 15/0285* (2013.01); *G08G 1/168* (2013.01); *B60W 2050/146* (2013.01); *B60W 2420/42* (2013.01); *B60W 2420/52* (2013.01); *B60W 2540/215* (2020.02); *B60W 2554/00* (2020.02); *B60W 2554/801* (2020.02); *B60W 2556/50* (2020.02); *B60W 2710/10* (2013.01); *B60W 2710/18* (2013.01); *B60W 2710/20* (2013.01); *B60W 2720/10* (2013.01); *B60W 2720/106* (2013.01); *B60W 2900/00* (2013.01)

(56) References Cited

U.S. PATENT DOCUMENTS

| | | | | |
|---|---|---|---|---|
| 10,392,009 | B2* | 8/2019 | Kim | ............... B60W 50/14 |
| 10,606,257 | B2* | 3/2020 | Kim | ............... G05D 1/0044 |
| 2009/0243889 | A1 | 10/2009 | Suhr et al. | |
| 2010/0017084 | A1 | 1/2010 | Riegel | |
| 2010/0097199 | A1 | 4/2010 | Schwartz et al. | |
| 2010/0204866 | A1 | 8/2010 | Moshchuk et al. | |
| 2010/0271236 | A1 | 10/2010 | Moshchuk et al. | |
| 2011/0074957 | A1* | 3/2011 | Kiyohara | ............ G06V 10/267 348/148 |
| 2011/0140921 | A1 | 6/2011 | Pampus | |
| 2012/0197492 | A1 | 8/2012 | Schneider et al. | |
| 2012/0316732 | A1* | 12/2012 | Auer | ............ B62D 15/0265 701/41 |
| 2013/0169792 | A1 | 7/2013 | Mathes et al. | |
| 2013/0314503 | A1 | 11/2013 | Nix et al. | |
| 2014/0081476 | A1 | 3/2014 | Verdugo-Lara et al. | |
| 2014/0303839 | A1 | 10/2014 | Filev et al. | |
| 2014/0350804 | A1 | 11/2014 | Park et al. | |
| 2015/0039173 | A1 | 2/2015 | Beaurepaire et al. | |
| 2015/0138011 | A1 | 5/2015 | Hiramaki et al. | |
| 2015/0166062 | A1 | 6/2015 | Johnson et al. | |
| 2015/0175205 | A1 | 6/2015 | Park et al. | |
| 2015/0203111 | A1 | 7/2015 | Bonnet et al. | |
| 2015/0329110 | A1 | 11/2015 | Stefan | |
| 2015/0375742 | A1 | 12/2015 | Gebert et al. | |
| 2016/0114728 | A1 | 4/2016 | Tan et al. | |
| 2016/0159397 | A1* | 6/2016 | Baek | ............ B60W 30/06 701/41 |
| 2016/0185389 | A1 | 6/2016 | Ishijima et al. | |
| 2016/0284217 | A1 | 9/2016 | Lee et al. | |
| 2017/0076603 | A1 | 3/2017 | Bostick et al. | |
| 2017/0096167 | A1 | 4/2017 | Yoon et al. | |
| 2017/0197615 | A1* | 7/2017 | Elie | ............ B60W 30/06 |
| 2018/0086381 | A1* | 3/2018 | Hoffman, Jr. | ........ G05D 1/0225 |
| 2018/0093664 | A1* | 4/2018 | Kim | ............ B60W 10/18 |
| 2018/0107207 | A1* | 4/2018 | Kim | ............ G06V 10/751 |
| 2018/0186365 | A1 | 7/2018 | Kim et al. | |
| 2021/0303872 | A1* | 9/2021 | Makke | ............ G06V 20/56 |

FOREIGN PATENT DOCUMENTS

| | | | |
|---|---|---|---|
| JP | 2007-290558 | A | 11/2007 |
| JP | 4078949 | B2 | 4/2008 |
| JP | 2008-296639 | A | 12/2008 |
| JP | 2009-020657 | A | 1/2009 |
| JP | 2010-95027 | A | 4/2010 |
| JP | 2011-524298 | A | 9/2011 |
| JP | 2012-116282 | A | 6/2012 |
| JP | 4985164 | B2 | 7/2012 |
| JP | 2013-093013 | A | 5/2013 |
| JP | 2013-0241088 | A | 12/2013 |
| JP | 2014-227021 | A | 12/2014 |
| JP | 5692292 | B2 | 4/2015 |
| JP | 2016-185745 | A | 10/2016 |
| KR | 10-2011 0114893 | | 10/2011 |
| KR | 10-2013-0073256 | A | 7/2013 |
| KR | 10-1305630 | B1 | 9/2013 |
| KR | 10-2014-0079984 | | 6/2014 |
| KR | 10-1426468 | B1 | 8/2014 |
| KR | 10-2015-0061422 | | 6/2015 |
| KR | 10-2015-0061422 | A | 6/2015 |
| KR | 10-2016-0146280 | A | 12/2016 |
| KR | 10-2016-0147557 | A | 12/2016 |
| WO | 2010/043944 | A1 | 4/2010 |
| WO | 2013/024981 | A2 | 2/2013 |

OTHER PUBLICATIONS

Extended European Search Report for European Application No. 17205206, dated May 24, 2018, 6 pages.

Ahrens, Dirk "Parking assistant with longitudinal and transverse guidance", BMW Group, Munich, Germany, with English translation (20 pages total), dated Aug. 3, 2018.

* cited by examiner

AUTOMATIC PARKING SYSTEM AND AUTOMATIC PARKING METHOD

CROSS-REFERENCE TO RELATED APPLICATION

This application is a continuation of U.S. patent application Ser. No. 15/833,842, filed on Dec. 6, 2017, which is a continuation-in-part (CIP) of U.S. patent application Ser. No. 14/935,984, filed on Nov. 9, 2015, and claims under 35 U.S.C. § 119(a) the benefit of Korean Patent Application No. 10-2015-0114025, filed on Aug. 12, 2015, respectively, the entire contents of which are incorporated herein by reference.

BACKGROUND

Field of the Invention

The present invention relates to automatic parking, and more particularly, to an automatic parking system and an automatic parking method that use detection of a parking area.

Description of the Related Art

An automatic parking system is a system that enables a driver to conveniently park a vehicle by determining a position of an obstacle using a camera or an ultrasonic sensor attached to a rear portion of the vehicle, and selecting parallel parking or perpendicular parking, then the automatic parking system performs a predetermined operation.

In particular, for an automatic parking system using a camera or other imaging device, in response to receive a driver selection of a parking position while checking a rear visual field through a monitor, the automatic parking system automatically operates a steering wheel of the vehicle using a sensor value, thereby safely parking the vehicle. Further, a parking area may be set in advance using the camera and a sensor, and the automatic parking system performs automatic parking using data obtained by the camera and the sensor. The camera may sense a front area, a rear area, and a side area and be implemented by around view monitoring (AVM). In general, the AVM system provides only the function of displaying images around the vehicle to a driver, and thus, the driver is required to determine a parking condition from the images provided by the AVM system.

SUMMARY

An object of the present invention is to provide an automatic parking system that performs automatic parking by setting an optimal parking area using a sensor, and an automatic parking method.

Another object of the present invention is to provide an automatic parking system that obtains an image around a vehicle using a plurality of imaging devices installed in the vehicle, converts the obtained image to recognize an available parking area, and provides a driver with a moving path that corresponds to the parking area, and an automatic parking method.

Still another object of the present invention is to provide an automatic parking system and an automatic parking system capable of remotely performing an automatic parking mode to adjust a spaced distance between a subject vehicle and vehicles parked on both sides of the subject vehicle to provide convenience when exiting the vehicle.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

According to an aspect of the claimed invention, an automatic parking system may include: a camera processor configured to acquire images around a subject vehicle, and convert the acquired images into external images and synthesize the external images; a sensor processor configured to measure spaced distances between the subject vehicle and surrounding vehicles; a parking space recognizing unit configured to periodically receive the spaced distances and the external images and sequentially compare the consecutive external images with the spaced distances using an image recognition technology to recognize parking areas; and a controller configured to calculate a moving path between a current position of the subject vehicle and an optimal parking area among the parking areas and operate the subject vehicle based on the moving path, in which the parking space recognizing unit may be configured to detect the parking areas based on a length and a width of the subject vehicle.

The parking space recognizing unit may be configured to extract feature points of the consecutive images using the image recognition technology, match the feature points of the two consecutive images, delete mismatched feature points, and match valid feature points to recognize the parking areas. The controller may be configured to operate the subject vehicle to prevent the subject vehicle from colliding with obstacles using data acquired by the sensor processor and the camera processor, while the subject vehicle travels along the moving path.

The sensor processor may be configured to sense spaced distances between the surrounding vehicles positioned at a side of the subject vehicle in the optimal parking area and the controller may be configured to operate the subject vehicle to adjust a first spaced distance from a passenger seat side vehicle positioned on a passenger seat side of the subject vehicle to be a predetermined reference distance based on the space distances. The controller may further be configured to adjust the first spaced distance to be the reference distance when the first spaced distance is less than the reference distance and then determine whether a second spaced distance between the subject vehicle and a driver's seat side vehicle positioned on the driver's seat of the subject vehicle is equal to or greater than the reference distance.

Additionally, the controller may be configured to operate the subject vehicle to adjust the second spaced distance to be the reference distance when the second spaced distance is equal to or greater than the reference distance. The controller may be configured to operate the subject vehicle to adjust the second spaced distance to be a predetermined minimum spaced distance when the second spaced distance is less than the reference distance. The minimum spaced distance may be set to be a distance between a main lane positioned between the subject vehicle and the driver's seat side vehicle and the subject vehicle.

The controller may be configured to determine whether a second spaced distance between the subject vehicle and a driver's seat side vehicle positioned on the driver's seat side of the subject vehicle is equal to or greater than a predetermined critical distance when the first spaced distance is less than the reference distance and the critical distance may be set to be a value obtained by adding a predetermined minimum spaced distance to a moving distance of the first spaced distance to adjust the first spaced distance to the reference distance. The sensor processor may be configured to detect surrounding parking around the optimal parking area and a parking line.

The automatic parking system may further include a display controller configured to output a notification to a driver regarding the parking areas, in which the controller may be configured to operate the vehicle to be driven in the optimal parking area selected by the driver. The controller may be configured to adjust steering, acceleration, brake, gear shift, and parking brake of the subject vehicle. The external image may be a top view image of the subject vehicle viewed from a top of the subject vehicle.

According to another aspect of the present invention, an automatic parking method for automatically parking a subject vehicle may include: setting the automatic parking mode; detecting parking areas using external images around the subject vehicle, spaced distances between the subject vehicle and surrounding vehicles, and a length and a width of the subject vehicle; selecting an optimal parking area among the parking areas; and automatically parking the subject vehicle in the optimal parking area, in which in the detecting of the parking areas, the parking areas may be recognized by sequentially comparing the consecutive external images with the spaced distances using an image recognition technology.

The automatic parking method may further include: terminating the automatic parking mode, after the automatically parking of the subject vehicle, in which the terminating of the automatic parking mode may be performed by turning off an automatic parking mode switch or shifting a gear to parking. In addition, when an automatic parking mode switch is turned off or a gear is shifted to parking, the automatic parking mode may be terminated. When any one of gear shift, steering change, and brake operation is performed, the automatic parking mode may be stopped.

The spaced distances may include a first spaced distance between the subject vehicle and a passenger seat side vehicle positioned on a passenger side of the subject vehicle and a second spaced distance between the subject vehicle and a driver's seat side vehicle positioned on the driver's seat of the subject vehicle and in the automatically parking of the subject vehicle, the subject vehicle may be operated to adjust the first spaced distance and the second spaced distance to be a predetermined reference distance. The detecting of the parking areas may include: extracting feature points of the consecutive images using the image recognition technology; deleting mismatched feature points by matching the feature points of the two consecutive images; and matching images based on valid feature points.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art may easily practice the present invention. However, the present invention may be implemented in various different forms and is not limited to the exemplary embodiments provided in the present description.

Portions unrelated to the description are omitted to obviously describe the present invention, and components that are the same as or similar to each other will be denoted by the same reference numerals throughout the specification A case in which any one part is "connected" with the other part includes a case in which the parts are "directly connected" with each other and a case in which the parts are "electrically connected" with each other with other elements interposed therebetween.

When it is described that any one part is "on" the other part, it may mean that the part is directly on the other part or any other part is interposed therebetween. On the contrary, when it is described that any one part is "directly on" the other part, there is no other part interposed therebetween. Terms "first", "second", "third", and the like are used to describe various parts, components, areas, layers, and/or sections, but are not limited thereto. These terms are used only to distinguish one part, component, area, layer, or section from another part, component, area, layer, or section. Accordingly, a first part, a first component, a first area, a first layer, or a first section to be described below may indicate a second part, a second component, a second area, a second layer, or a second section without departing from the scope of the present invention.

Technical terms used herein are merely to describe a specific exemplary embodiment, but are not intended to limit the present invention. Terms "below", "above", and the like indicating a relative space may be used to more easily describe a relationship between one part with another part illustrated in the drawings. These terms are intended to include other meanings or operations of a device that is being used, in addition to meanings intended in the drawings. For example, when the device in the drawing is inverted, any part described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Although not defined otherwise, all terms including technical terms and scientific terms used herein have the same meanings as those generally understood by a person having ordinary knowledge in the art to which the present invention pertains. Terms defined in a dictionary generally used are additionally interpreted as having a meaning consistent with the related art documents and contents currently disclosed, and unless defined otherwise, are not interpreted as having an ideal or very official meaning.

Hereinafter, exemplary embodiments of the present invention will be described in detail with reference to the accompanying drawings so as to be easily practiced by a person having ordinary knowledge in the art to which the present invention pertains. However, the present invention may be implemented in various different forms and is not limited to the exemplary embodiments provided in the present description.

Figure 1:
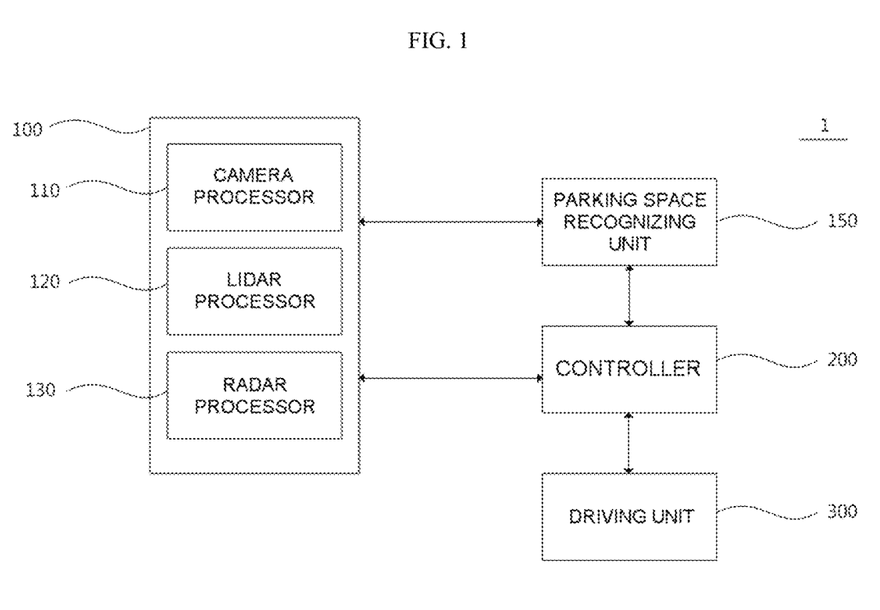
FIG. 1 is a diagram showing components of an automatic parking system according to an exemplary embodiment of the present invention.

FIG. 1 is a diagram showing components of an automatic parking system according to an exemplary embodiment of the present invention. Referring to FIG. 1, the automatic parking system 1 may include a sensor unit 100, a parking space recognizing unit 150, a controller 200, and a driving unit 300. The controller 200 may be configured to operate the other components of the parking system 1. The data acquired by the sensor unit 100 may be transmitted to the parking space recognizing unit 150 and the controller 200 and the parking space recognizing unit 150 may be configured to calculate the data acquired by the sensor unit 100. The controller 200 may be configured to operate the driving unit 300 to park the subject vehicle in the parking area calculated by the parking space recognizing unit 150.

The sensor unit 100 may include a camera processor 110, a Lidar processor 120, and a radar processor 130. The camera processor 110 may be configured to sense a front area, a rear area, and/or a side area of a subject vehicle, and transmit data obtained therethrough to the controller (e.g., an electronic control unit ECU level). The camera processor 110 may include an image sensor, an image processor, and a camera motor control unit (MCU). For example, the image sensor may be configured to sense an image of a subject photographed through a lens, the image processor may be configured to receive the sensed data from the image sensor and process the received data, and the camera MCU may be configured to receive the processed data from the image processor.

For example, the camera processor 110 may include an around view monitoring (AVM) system. The AVM may be implemented by installing a plurality of camera devices for photographing the periphery of the vehicle and acquiring images in all directions of the vehicle. The AVM provides the driver with the images photographed through the plurality of camera devices, thereby securing a field of vision around the subject vehicle and eliminating blind spots.

As another example, the camera processor 110 may be configured to acquire data regarding a preceding vehicle, a forward lane, a preceding cyclist, a traffic sign, active high beam control (AHB), wheel detection (e.g., data to more rapidly recognize another vehicle through vehicle wheel recognition with respect to a close cut-in vehicle that comes into a field-of-view (FOV) of a camera), a traffic light, road marking (e.g., arrow on road), vehicle detection (VD) at any angle (e.g., data for recognizing a vehicle with respect to all driving directions or angles of the preceding vehicle), road profile (e.g., data for improving riding quality through suspension control by recognizing a shape of forward road (unevenness, a speed bump, or a groove)), semantic free space (e.g., boundary labeling), a general object (neighboring vehicle, etc.), advanced path planning (e.g., data for predicting a vehicle driving path by deep learning through surrounding environment even on a road without lane or a contaminated road), odometry (e.g., data for combination with recognition information of global positioning system (GPS) by recognizing a landmark on a driving road), a parking line and an interval between vehicles for parking, etc.

The Lidar processor 120 may be connected to a Lidar device which is a sensor, and the Lidar device may be configured to sense a front area, a rear area, and a side area of the vehicle. The Lidar device may be configured of a laser transmission module, a laser detection module, a signal collection and processing module, and a data transmission and reception module, and as a light source of a laser, laser light sources with a wavelength in a wavelength range of about 250 nm to 11 µm or with variable wavelength may be used. Further, the Lidar device may be classified into a time of flight (TOP) type and a phase shift type according to a signal modulation scheme.

The radar processor 130 may be connected to a radar device which is a sensor configured to sense an object in the front area, the rear area, and the side area of the vehicle. The radar device may be a sensor device using an electromagnetic wave to measure a distance, a speed, or and angle of an object. When using the radar device, it may be possible to sense an object within about 150 m in a horizontal angle range of about 30 degrees using a scheme of a frequency modulation carrier wave (FMCW), or a pulse carrier. The radar processor 130 may be configured to process data sensed and output by the radar device, and this processing may include magnification of the sensed forward object and focusing on an area of the object in the entire view area.

The Lidar processor 120 and the radar processor 130 may be configured to measure a spaced distance between the subject vehicle and the surrounding vehicles or obstacles while the subject vehicle is being driven and parked and may be configured to transmit data regarding the spaced distance to the controller 200. The controller 200 may then be configured to prevent a potential collision between the subject vehicle and the obstacles or surrounding vehicles based on the data regarding the spaced distance.

The parking space recognizing unit 150 may be configured to recognize the parking areas in which the subject vehicle may be parked by receiving the images and the data regarding the spaced distance obtained using the sensor unit 100 including the camera processor 110. The parking space recognizing unit 150 may further be configured to recognize the parking space and detect a vehicle trajectory by comparing two consecutive images from the images periodically input. The data regarding the spaced distance between the subject vehicle and the surrounding vehicles (or obstacles) acquired using the Lidar processor 120 and the Radar processor 130 may help the parking space recognizing unit 150 to recognize and calculate the parking areas.

The controller 200 may be an electronic control unit (ECU), and may be an upper controller configured to operate multiple electronic devices used within a vehicle. For example, the controller 200 may be configured to operate all of processors belonging to the processor level and controllers belonging to the controller level. The controller 200 may be configured to receive sensing data from the processors, generate a control command to operate a controller in consideration of circumstances, and transmit the control command to the controllers. In the present specification, for convenience of explanation, the ECU level is described as a higher level than the processor level, however, there may be a case in which one of the processors belonging to the processor level operates as an ECU, or a case in which two processors are combined to operate as an ECU.

Furthermore, the driving unit 300 may include a display controller, a steering controller, a drive controller, a brake controller, a gear controller, and the like. Each of the controllers may be configured to operate components of a vehicle based on the control command received from the controller 200. In particular, the display controller may be configured to provide the driver with information regarding a specific situation or output a warning regarding a dangerous situation. The display controller may be configured to generate an audio signal, a video signal, or a haptic signal for providing a warning of driving situation of the vehicle and dangerous situation. For example, the display controller may be configured to output a situation explanation and a warning sound in an audio, and output a message visually regarding the situation or a warning message through a head up (HUD) display or a side mirror display. Alternatively, the display controller may be configured to operate a vibration motor mounted in a handle to generate warning vibration.

The steering controller may be configured to operate a motor driving power steering (MDPS) system driving a steering wheel. For example, when a collision risk of the vehicle is detected, the steering controller may be configured to adjust a steering of the vehicle in a direction in which the collision may be avoided or a damage may be minimized. The driving controller may be configured to perform deceleration, acceleration, on/off of an engine to drive the vehicle. For example, the driving controller may be configured to decelerate the vehicle when the collision risk is detected while the vehicle is being driven, and turn the engine on or off at the start or end of the driving of the vehicle based on the control command of the controller 200. The brake controller may be configured to operate a brake of the vehicle, and adjust an engagement amount of a brake pedal. For example, when a front collision risk is detected, the brake controller may be configured to automatically operate an emergency brake based on the control command of the controller 200 regardless of whether the driver operates the brake.

Meanwhile, hereinabove, the processors, the ECUs, and the controllers are described as independent components with reference to the accompanying drawings, but it is to be understood that the present invention is not necessarily limited thereto. Two or more processors may be integrated as one processor and may work in conjunction with each other, two or more processors and an ECU may be integrated as one device, two or more controllers may be integrated as one controller and may work in conjunction with each other, two or more controllers and an ECU may be integrated as one device.

Figure 2:
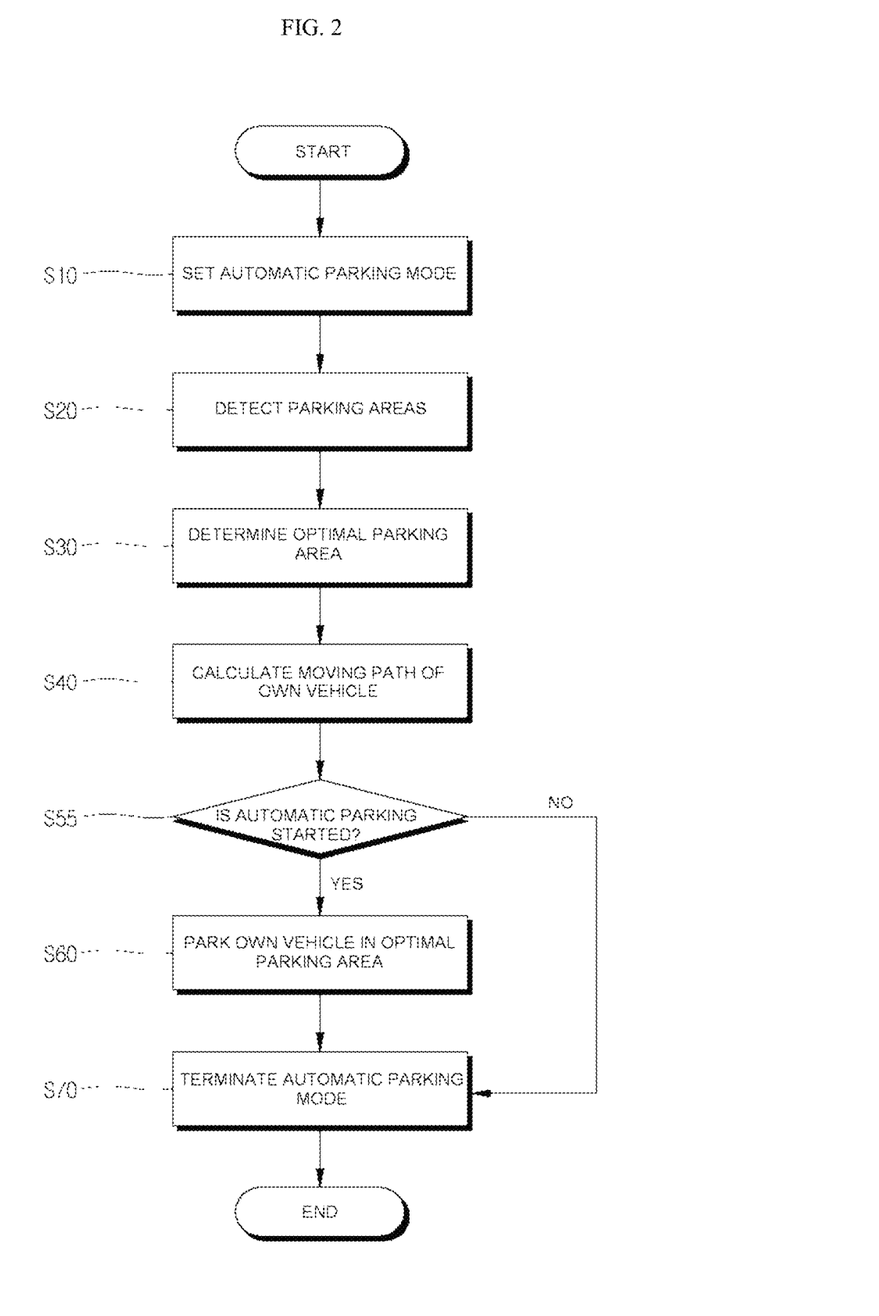
FIG. 2 is a flowchart showing a sequence of an automatic parking method according to an exemplary embodiment of the present invention.

FIG. 2 is a flowchart showing a sequence of an automatic parking method according to an exemplary embodiment of the present invention. The automatic parking system according to an exemplary embodiment of the present invention refers to a partially automated parking system (PAPS).

Referring to FIG. 2, the driver may set an automatic parking mode provided in the vehicle. By setting the automatic parking mode, a vehicle mode may be changed from a standby mode to an active mode in which automatic parking may be performed. A method of setting the automatic parking mode may include a first type method in which the driver executes the automatic parking mode while remaining in the driver's seat of the vehicle, and a second type method in which the driver executes the automatic parking mode extraneous to the vehicle or while remaining in a seat other than the driver's seat using a remote controller (S10).

The sensor unit may be configured to sense the surrounding area of the subject vehicle to calculate a plurality of parking areas in which the subject vehicle may be parked.

The sensor unit may further be configured to sense parking lines, curbs disposed near the parking lines, an empty space between surrounding vehicles, etc. The controller may then be configured to calculate parking areas based on a length and a width of the subject vehicle (S20). The controller may also be configured to display to the driver data on the calculated parking areas using the display controller.

The driver may select a parking area that is determined as an optimal parking area through a display device (e.g., an input device on the display) or a separate switch within the vehicle (the first type method), or may select a parking area that is determined as an optimal parking area using a remote controller (the second type method). In particular, the controller may be configured to provide a recommendation to the driver regarding a parking area that is determined as an optimal parking area among the parking areas (S30). When an optimal parking area is determined, the controller may be configured to calculate a moving path between a current position and the optimal parking area. The controller may further be configured to drive the subject vehicle based on the moving path, automatically drive the subject vehicle, and operate the steering controller, the driving controller, the brake controller, and the gear controller.

Particularly, the controller may be configured to operate the subject vehicle at a speed of less than about 10 km/h, and adjust deceleration or acceleration of the vehicle, gear change, braking and parking braking, etc. The sensor unit may be configured to sense a distance from an obstacle during automatic parking of the subject vehicle, and the controller may be configured to determine possibility of collision based on the distance between the subject vehicle and the obstacle and inform the driver of the determined possibility. The sensor unit may include at least one of a camera device configured to sense a distance between the subject vehicle and an obstacle, a Lidar device, and a radar device.

The driver may select whether to perform automatic parking. When the driver selects the automatic parking, the controller may be configured to automatically operate the subject vehicle to park the subject vehicle in an optimal parking area, and when the driver does not select the automatic parking, the driver may directly or manually park the subject vehicle in the optimal parking area. When the driver turns off an execution switch of the automatic parking mode or shifts the gear to parking (P) during the automatic parking, the subject vehicle may stop. Accordingly, the controller may be configured to request the driver to select whether to maintain the automatic parking mode through the display controller. Based on an intention of the driver, the automatic parking mode may be executed again or terminated.

Further, when the gear is shifted to another gear other than parking (P) during the automatic parking, and when the steering is changed to a predetermined degree or greater, the vehicle may stop. For example, steering change of a predetermined degree may indicate a steering change of about 5 Nm of torque applied to the steering wheel. Accordingly, the controller may be configured to request the driver to select whether to maintain the automatic parking mode through the display controller. Based on an intention of the driver, the automatic parking mode may be executed again or terminated.

Additionally, when the braking is performed to a predetermined degree or greater during the automatic parking, the controller may be configured to determine that the braking of the driver should be preferentially performed, rather than application of the automatic parking system. In other words, the subject vehicle may stop by the brake engagement of the driver (S55 and S60). In addition, the automatic parking mode may be terminated following the intention of the driver. The driver may turn off the execution switch of the automatic parking mode (the first type) or cancel the execution of the automatic parking mode using the remote controller (the second type) (S70).

Figure 3:
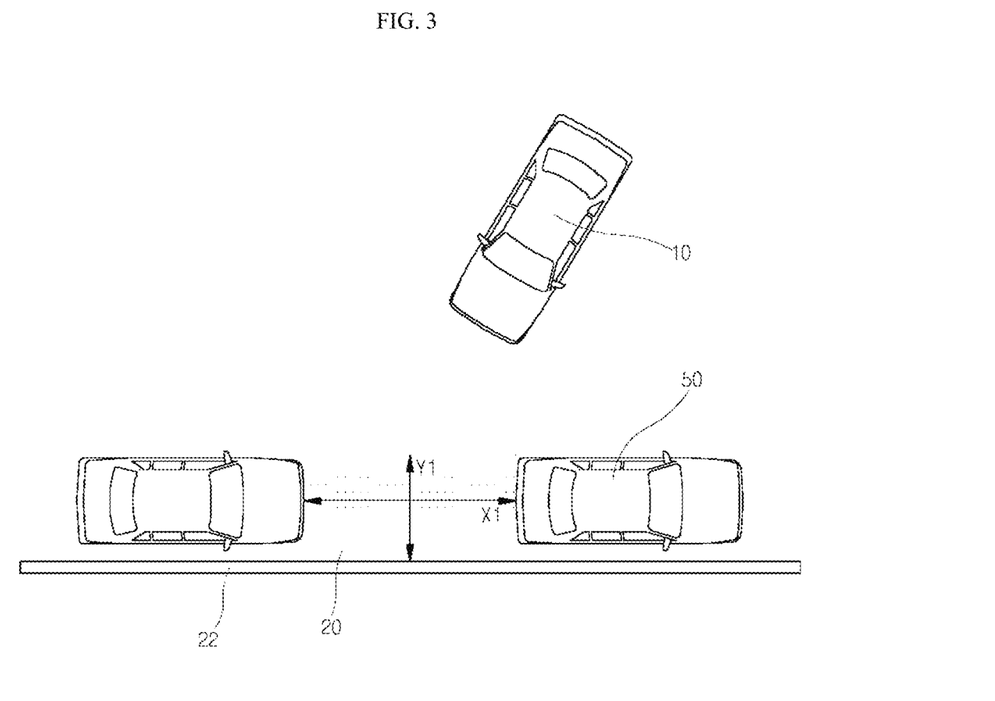
FIG. 3 is a diagram showing a parking area at the time of parallel parking according to an exemplary embodiment of the present invention.
Figure 4:
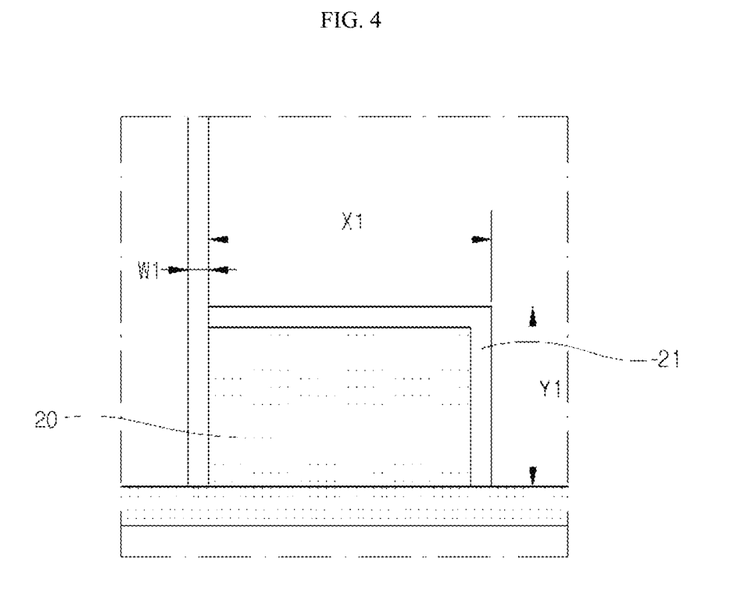
FIG. 4 is a diagram showing a parking area in which there is a parking line at the time of parallel parking according to an exemplary embodiment of the present invention.

FIG. 3 is a diagram showing a parking area at the time of parallel parking according to an exemplary embodiment of the present invention, and FIG. 4 is a diagram showing a parking area in which there is a parking line at the time of parallel parking according to an exemplary embodiment of the present invention.

Referring to FIGS. 3 and 4, it may be possible to detect parking areas in which parallel parking may be executed using the sensor unit attached to a subject vehicle 10. The sensor unit may be configured to detect a parking line 21, a curb 22 disposed around parking areas, and a space between surrounding vehicles 50, and the controller may be configured to calculate parking areas by calculating whether the spaces are a space in which the subject vehicle 10 may be parked based on such information (e.g., determining whether the vehicle would be capable of fitting into the parking space due to the spatial constraints). In particular, the controller may then be configured to calculate an optimal parking area 20 most suitable for parking among parking areas. The controller may also be configured to select an optimal parking area 20 based on a length and a width of the subject vehicle 10.

Referring to FIG. 3, the controller may be configured to calculate the optimal parking area 20 by calculating a space between surrounding vehicles 50. The curb 22 may assist in defining a space between surrounding vehicles 50. Further, the sensor unit may be configured to sense an alignment line of the surrounding vehicles 50 parked in parallel to assist in calculating the optimal parking area 20. The optimal parking area 20 may have a length X1 that extends in a direction in which the surrounding vehicles 50 are parked, and a width Y1 that extends in a direction perpendicular to that of the length X1. The length X1 may be a value obtained by adding a length of the subject vehicle 10 and first room (+a), and the width Y1 may be a value obtained by adding a width of the subject vehicle 10 and second room (+b).

For example, when the length of the subject vehicle 10 is short (e.g., about 4 m or less), the first room (+a) may satisfy +a=4m×0.25 when the length of the subject vehicle 10 is long (e.g., 6 m or greater), the first room (+a) may satisfy +a=6m×0.25, and the second room (+b) may be 0.2 m. In other words, the controller may be configured to calculate the optimal parking area 20 by considering the length and the width of the subject vehicle 10.

Referring to FIG. 4, the sensor unit may be configured to sense the parking line 21, and the controller may be configured to determine whether the subject vehicle 10 may be parked by calculating a length X1 and a width Y1 of the parking line 21. The parking line 21 may have a contrast range of at least 5. The parking line 21 may have a constant width W1, and the controller may be configured to determine whether it is an optimal parking area 20 by considering the length X1, the width Y1, and the width W1 of the parking line 21.

Figure 5:
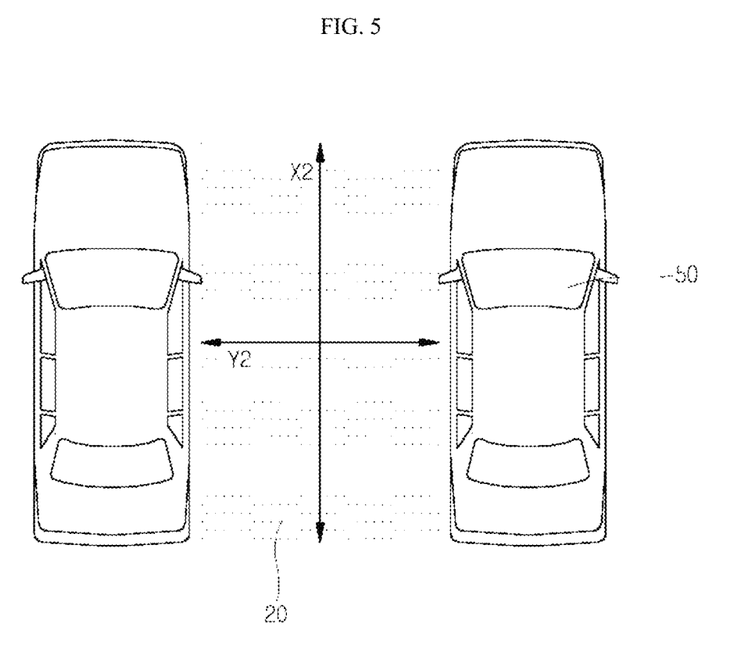
FIG. 5 is a diagram showing a parking area at the time of perpendicular parking according to an exemplary embodiment of the present invention.
Figure 6:
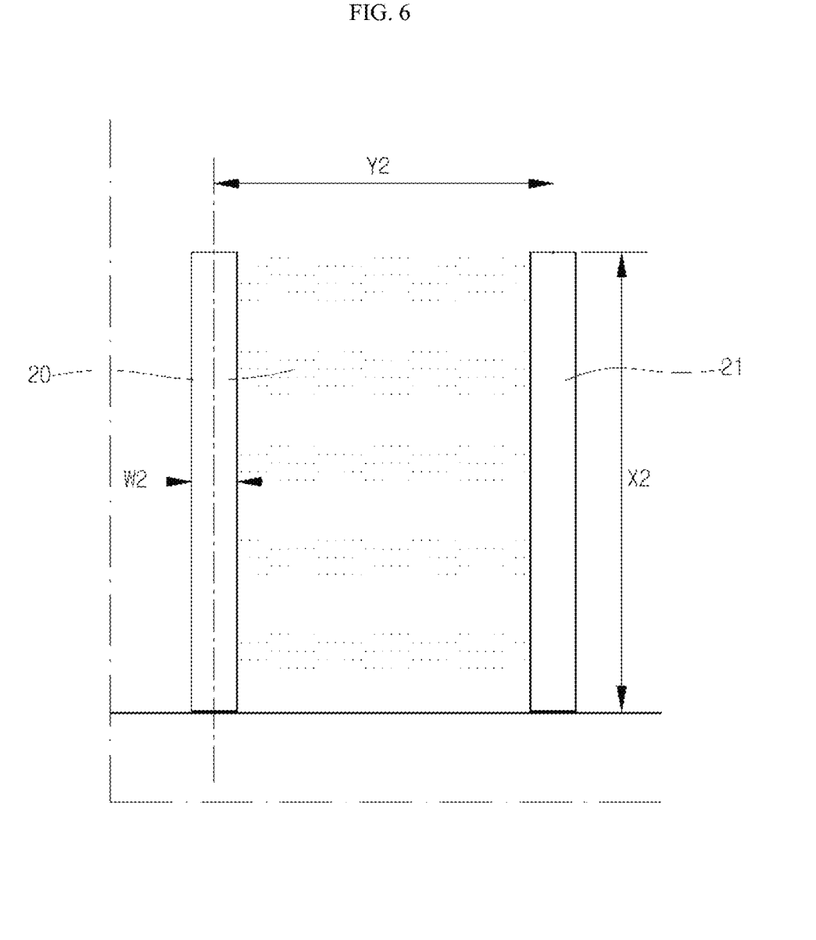
FIG. 6 is a diagram showing a parking area in which there is a parking line at the time of perpendicular parking according to an exemplary embodiment of the present invention.

FIG. 5 is a diagram showing a parking area at the time of perpendicular parking according to an exemplary embodiment of the present invention, and FIG. 6 is a diagram showing a parking area in which there is a parking line at the time of perpendicular parking according to an exemplary embodiment of the present invention.

Referring to FIGS. 5 and 6, it may be possible to detect parking areas in which perpendicular parking may be executed through the sensor unit attached to the subject vehicle. The sensor unit may be configured to detect a parking line 21 and a space between surrounding vehicles 50, and the controller may be configured to calculate parking areas by calculating whether the spaces are a space in which the subject vehicle may be parked based on such information (e.g., whether the vehicle is capable of fitting into the space due to spatial constraints).

Referring to FIG. 5, the controller may be configured to calculate the optimal parking area 20 by calculating a space between surrounding vehicles 50. The optimal parking area 20 may have a width Y2 that extends in a direction in which the surrounding vehicles 50 are parked, and a length 2 that extends in a direction perpendicular to that of the width Y2. The length X2 may be similar to the length of the subject vehicle, and the width Y2 may correspond to a value obtained by adding the width of the subject vehicle and third room (+c). For example, the third room (+c) may be about 1.2 m.

Referring to FIG. 6, the sensor unit may be configured to sense the parking line 21, and the controller may be configured to determine whether the subject vehicle 10 may be parked by calculating a length X2 and a width Y2 of the parking line 21. The parking line 21 may have a contrast range of at least 5. The parking line 21 may have a constant width W2, and the controller may be configured to determine whether it is an optimal parking area 20 by considering the length X2, the width Y2, and the width W2 of the parking line 21. For example, when the subject vehicle is a large vehicle (e.g., a truck, SUV, or the like), the length X2 may be greater than the length of the subject vehicle by about 1.0 m, and the width Y2 may be greater than the width of the subject vehicle by about 0.06 m. In other words, the controller may be configured to calculate the optimal parking area 20 by considering the length and the width of the subject vehicle 10.

Figure 7:
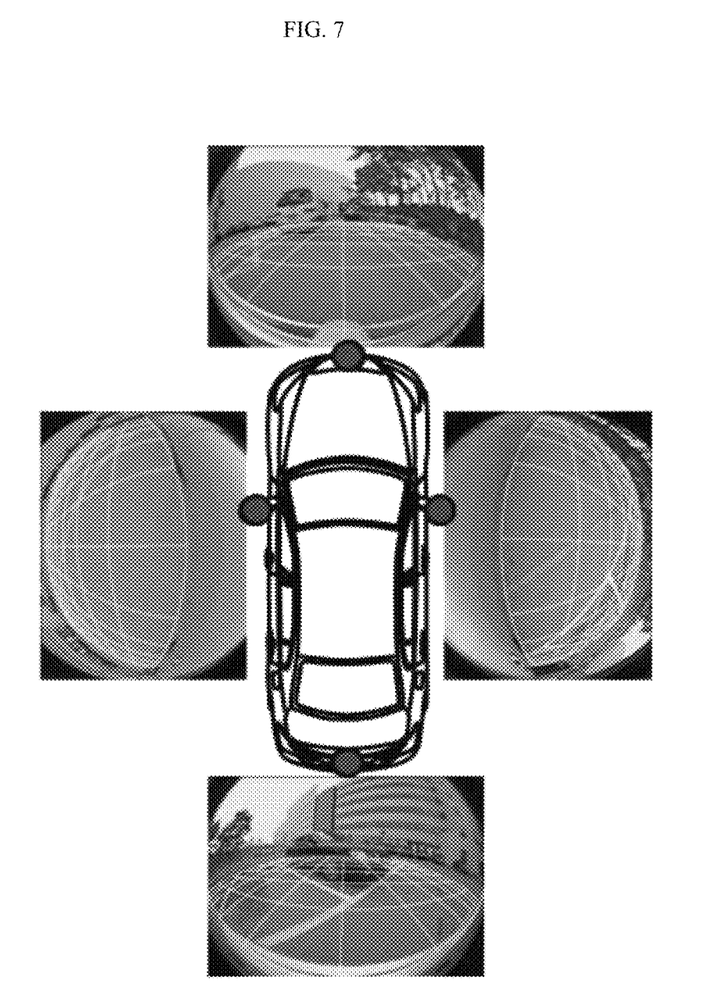
FIG. 7 is a diagram showing an image of a top view format obtained by being converted and synthesized by virtual camera modeling according to an exemplary embodiment of the present invention.

FIG. 7 is a diagram showing an image of a top view format obtained by being converted and synthesized by virtual camera modeling according to an exemplary embodiment of the present invention. Referring to FIGS. 1 and 7, when the camera processor 110 is implemented as the AVM, the images around the subject vehicle may be photographed at 360° in all directions with respect to the subject vehicle. The virtual camera modeling may be performed by the parking space recognizing unit 150 or the controller 200 (which may be included in the AVM) photographed through the AVM, and as a result, may be converted into the external image that is a two-dimensional (2D) image. In particular, the external image may be a top view, that is, a bird's eye view image, such as when viewing the vehicle from the top of the subject vehicle.

FIGS. 8 to 11 are diagrams showing a process of recognizing a parking area of a parking space recognizing unit according to an exemplary embodiment of the present invention. Referring to FIGS. 1 and 8 to 11, a corner detection technology for comparing two consecutive images to recognize parking areas may be used. The corner detection technology, which is a technology of recognizing an image by extracting corners of objects included in the image, is generally used to determine a difference between the consecutive images.

Particularly, in the image processing and recognizing fields, the corner information becomes an important reference point in fields such as shape and tracking, and therefore the present invention may use the corner detection as described above to recognize the images around the consecutively photographed top view type vehicle, thereby extracting main feature points. Among the corner detection technologies as described above, the most representative Harris corner detection technology may be used. However, the corner detection technology may not be limited thereto.

Figure 8:
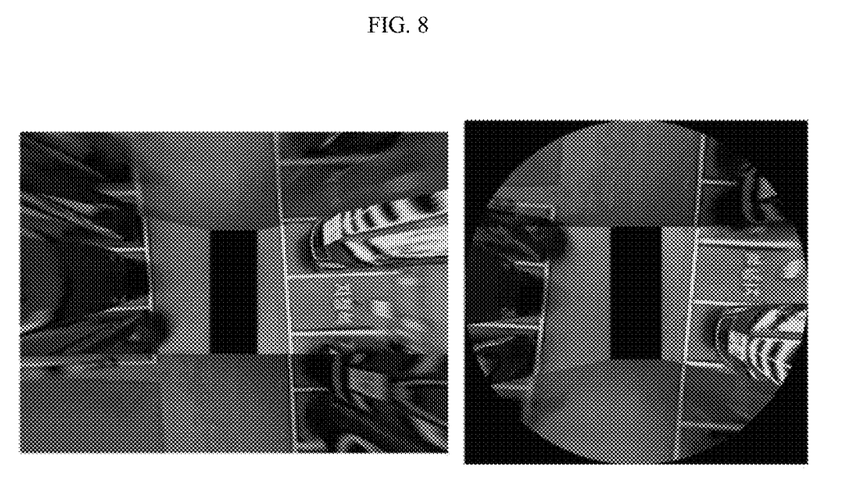
FIGS. 8 to 11 are diagrams showing a process of recognizing a parking area of a parking space recognizing unit according to an exemplary embodiment of the present invention.
Figure 9:
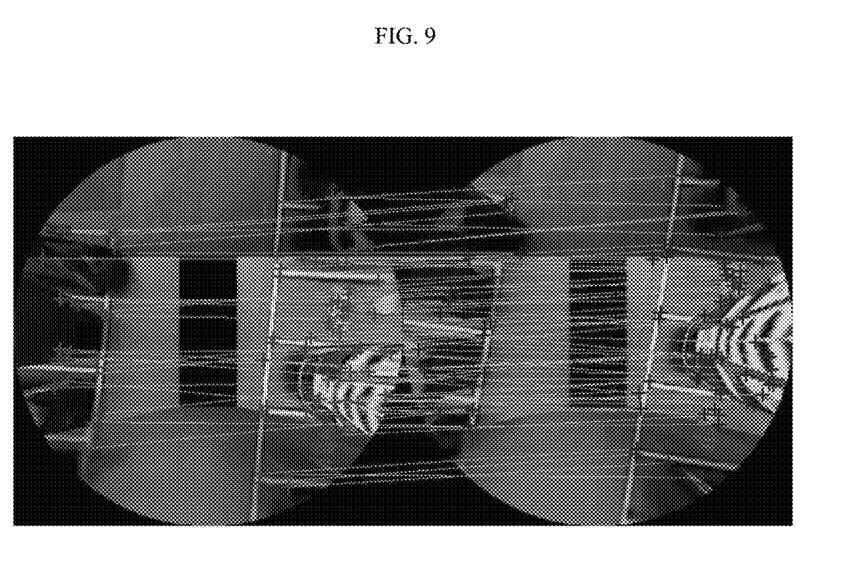

When the main feature points of two consecutive images are extracted, the controller 200 may be configured to match and compare the feature points of the two consecutive images. The known normalized cross correlation (NCC) technology may be used to match the feature points of the two consecutive images. The NCC technology is a technology for normalizing two images to compare the two images with each other. The controller 200 may use the NCC technology to normalize and compare the two consecutive images that vary based on the movement of the vehicle. In particular, the controller 200 may use brightness values of 7×7 square area pixels around the feature points of the two consecutive images as descriptors of the feature points, normalize them using the NCC technology to match each feature point with each other, and measure similarity.

Figure 10:
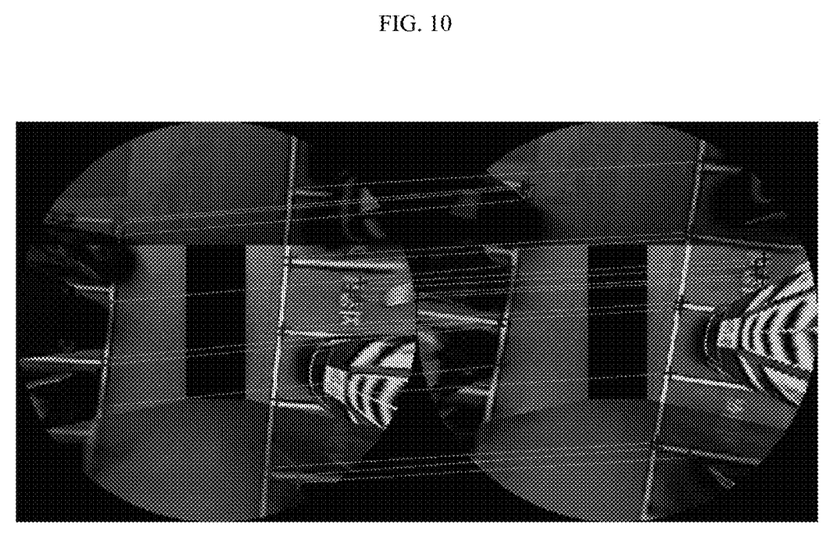

As described above, when the respective feature points of the two consecutive images normalized are matched with each other, as illustrated in FIG. 10, the step of deleting the mismatched feature points may be performed. The step of deleting the mismatched feature points may be performed to extract an angular difference between the two consecutive images using a similarity transformation model and compare only valid feature points using a random sample consensus (RANSAC) technology displacement difference. The RANSAC technology is a well-known technology of predicting factors of a mathematical model from a series of data sets including false information (mismatched feature points in the embodiment of the present invention) by a repetitive operation.

Figure 11:
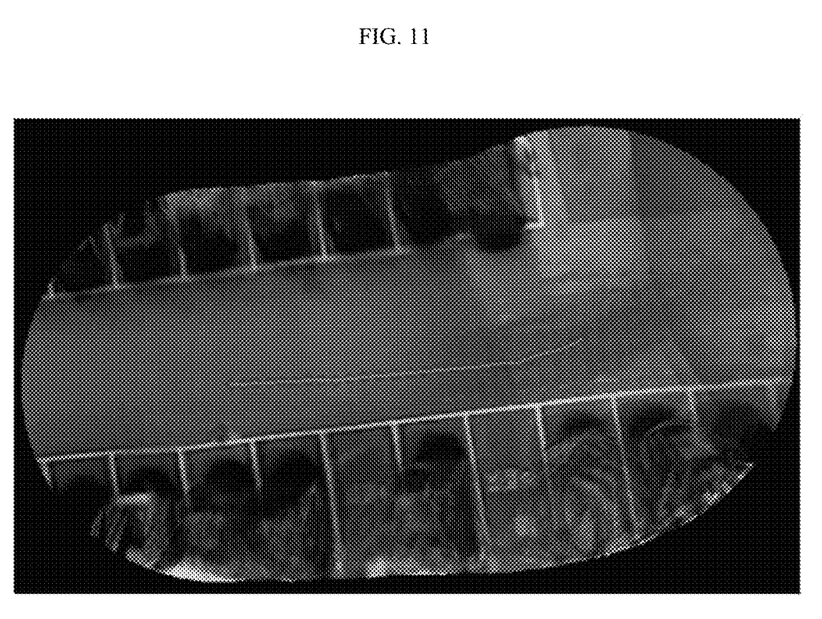

In particular, the controller 200 may be configured to recognize the mismatched feature points using the RANSAC technology and delete those feature points. When the mismatched feature points are deleted as described above and the valid feature points are selected, as illustrated in FIG. 11, the process of matching the images based on the estimated valid feature points may be performed. In other words, the movement trajectory of the vehicle may be recognized and the position of the vehicle may be estimated, by continuously performing the steps of FIGS. 8 to 10 and continuously matching the consecutive images based on the movement of the vehicle.

Figure 12:
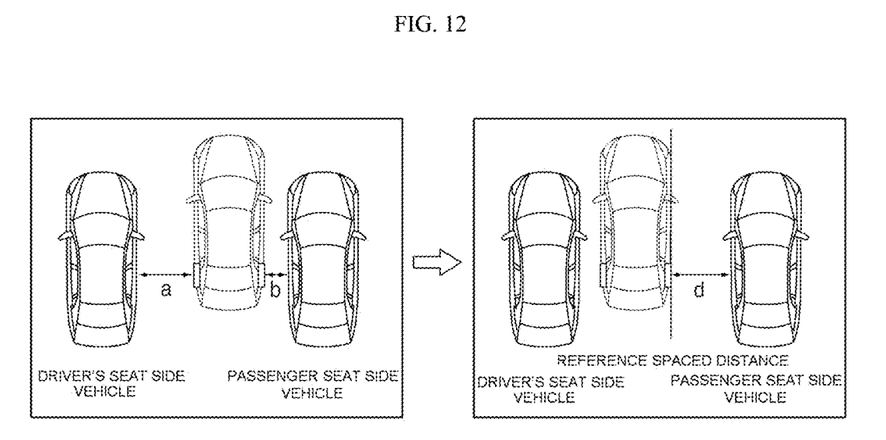
FIG. 12 is a diagram illustrating adjustment of a spaced distance at the time of automatic parking according to a second exemplary embodiment of the present invention.

FIG. 12 is a diagram illustrating adjustment of a spaced distance at the time of automatic parking according to a second exemplary embodiment of the present invention. The driver's seat side distance a refers to a spaced distance between the subject vehicle and surrounding vehicles positioned on a driver's seat side of the subject vehicle and a passenger seat side distance b refers to a distance between the subject vehicle and the surrounding vehicles positioned on the passenger seat side.

Referring to FIGS. 12 and 10, when the subject vehicle enters the optimal parking area, the spaced distance between the subject vehicle and the surrounding vehicles may be adjusted. When the extracted passenger side distance b is less than the predetermined reference distance d when the subject vehicle enters the optimal parking area, the space may be determined to be insufficient (e.g., too small) and when the driver's seat side distance a is sufficient to meet the reference distance d after a parking space with respect to the passenger seat side distance b is secured, a control to secure a spare space may be performed.

When the driver's seat side distance a is insufficient, the minimum spaced distance control may be performed. In other words, as in the present exemplary embodiment, the conditions under which the spare space securing control is performed are that the spaced distance between the vehicle and the passenger side vehicle is less than the reference distance (b <d) and the spaced distance between the vehicle and the passenger side vehicle is adjusted to be reference distance and then the spaced distance between the vehicle and the driver's seat side vehicle positioned on the driver's side of the vehicle is equal to or greater than the critical distance.

In particular, the critical distance may be expressed by the sum of the predetermined minimum spaced distance and |d−b| In other words, when a≥minimum spaced distance+ |d−b|, the spare space securing control may be performed, and the controller may be configured to operate the subject vehicle to adjust the distance between the vehicle and the passenger seat side vehicle to be the reference distance. A distance control amount corresponds to d−b.

Figure 13:
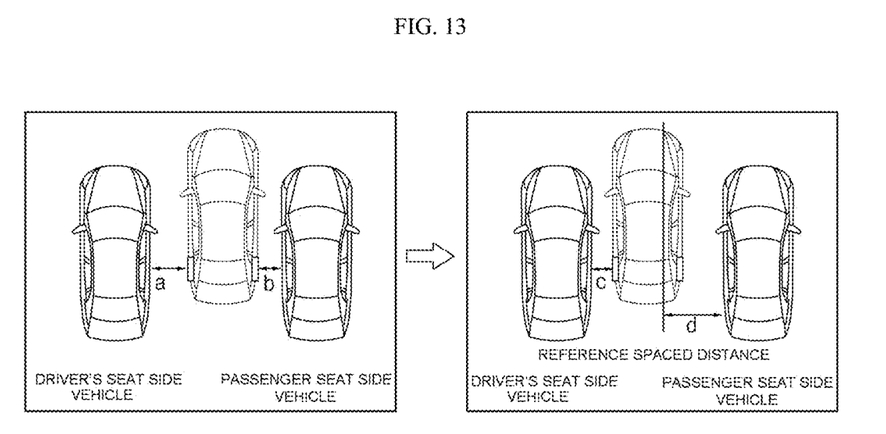
FIG. 13 is a diagram illustrating the adjustment of the spaced distance at the time of the automatic parking according to the second exemplary embodiment of the present invention.

FIG. 13 is a diagram illustrating adjustment of a spaced distance at the time of automatic parking according to a second exemplary embodiment of the present invention. Referring to FIG. 13, when the extracted passenger side distance b is less than the reference distance when the subject vehicle enters the optimal parking area, the space may be determined to be insufficient and when the driver's seat side distance a is insufficient to meet the reference distance d after the parking space with respect to the passenger seat side distance b is secured, the minimum spaced distance control may be performed.

In other words, as in the present exemplary embodiment, the conditions under which the minimum spaced distance control is performed are that the spaced distance between the subject vehicle and the passenger side vehicle is less than the reference distance (b<d) and the spaced distance between the vehicle and the passenger side vehicle is adjusted to be reference distance and then the spaced distance between the subject vehicle and the driver's seat side vehicle positioned on the driver's side of the subject vehicle is less than a critical distance.

In particular, the critical distance may be expressed by the sum of the predetermined minimum spaced distance and |d−b|. In other words, when a <minimum spaced distance+ |d−b|, the minimum spaced distance control may be performed, and the controller may be configured to operate the subject vehicle to adjust the distance between the subject vehicle and the passenger seat side vehicle to be the predetermined minimum spaced distance. The minimum spaced distance may be set to be a distance from a parking line between the subject vehicle and the driver's seat side vehicle to the subject vehicle or may be set to any value, and the distance control amount to which the vehicle moves corresponds to a−c.

According to the exemplary embodiment of the present invention, it may be possible to provide the automatic parking system capable of setting an optimal parking area among parking areas to automatically perform parking from a current position of a subject vehicle to the optimal parking area. According to the exemplary embodiment of the present invention, the images around the vehicle may be acquired using the AVM system and converted into the top view image, thereby recognizing the situations around the vehicle in real time and recognizing the parking space in any direction around the vehicle.

According to the exemplary embodiment of the present invention, the images around the vehicle may be continuously photographed to be registered, and the consecutive images may be compared with each other to perform the parking space and the parking line to show the path through which the vehicle passes and display the optimal parking space, thereby improving the reliability of parking and the accuracy. Further, it may be possible to improve the stability of the parking assistance system by providing the top view based image to the driver and visualizing the parking process.

According to the exemplary embodiment of the present invention, it may be possible to allow a driver conveniently enter and exit a subject vehicle and surrounding vehicles by adjusting the spaced distance from the surrounding vehicles parked on both sides of the subject vehicle when the automatic parking system is performed. Additionally, it may be possible to readjust the spaced distance between the subject vehicle and the surrounding vehicles in response to determining that the space is insufficient to enter or exit the vehicles based on the detected parking condition.

Meanwhile, it is to be understood that a partially automated parking system is described in the present specification by way of example for convenience of explanation. As described above, the PAPS is merely one of several advanced driving assistance system (ADAS) functions, and it is to be understood that implementation of the PAPS suggested in the present invention may also be used for implementation of other relevant ADAS functions. For example, the method suggested in the present invention may also be used to implement one function or a combination of a plurality of functions ADAS functions such as a PAPS, a land departure warning system (LDWS), a lane keeping assistance system (LKAS), a pedestrian detection and collision mitigation system (PDCMS), a forward vehicle collision warning system (FVCWS), a low speed following (LSF), a maneuvering aids for low speed operation (MALSO) and an extended range backing aid (ERBA), etc.

Further, an arbitrary connection is appropriately referred to as a non-transitory computer-readable medium. For example, when software is transmitted from a website, a server, or other remote source by using a coaxial cable, an optical fiber cable, a twisted-pair cable, a digital subscriber line (DSL), or wireless technologies such as infrared, radio, and ultra high frequency, the coaxial cable, the optical fiber cable, the twisted-pair cable, the DSL, or the wireless technologies such as infrared, radio, and ultra high frequency are included in definition of the medium. The disk and disc as used herein includes a compact disc, a laser disc, an optical disc, a digital versatile disc (DVD), a floppy disc, and a Blu-ray disc, and disks generally magnetically reproduce data, but discs optically reproduces data by laser. The above combinations also should be included in a range of the computer-readable medium.

When the exemplary embodiments are implemented by a program code or code segments, it is to be recognized that the code segment may represent a procedure, a function, a sub-program, a program, a routine, a sub-routine, a module, a software package, a class, or any combination of commands, data structures, or program instructions. The code segment may be connected to another code segment or a hardware circuit by transferring and/or receiving information, data, an argument, a parameter, or memory contents. The information, the argument, the parameter, the data, and the like may be transferred, sent, or transmitted by using any appropriate means including memory share, message transmission, token transmission, network transmission, etc. In addition, in some aspects, steps and/or operations of a method or an algorithm may reside as one of codes and/or commands or any combination or a set thereof on a machine-readable medium and/or a computer-readable medium that may be integrated as a computer program object.

In the implementation as software, technologies described herein may be implemented by modules (e.g. procedure, function, etc.) performing the functions described herein. The software codes may be stored in memory units and may be executed by processors. A memory unit may be implemented in a processor or outside the processor, and in this case, the memory unit may be connected to the processor in a manner that the memory unit may perform communication with the processor by various means as known in the art.

In implementation as hardware, processing units may be implemented by one or more of an application specific integrated chip (ASIC), a digital signal processor (DSP), a digital signal processing device (DSPD), a programmable logic device (PLD), a field programmable gate array (FPGA), a processor, a controller, a microcontroller, a microprocessor, and other electronic units designed to perform the functions described herein, or in a combination thereof.

The above description includes an example of one or more exemplary embodiments. It is apparent that those skilled in the art may recognize that every possible combinations of components or method may not be described for explanation of the above described exemplary embodiments, but additional combination and substitution of various exemplary embodiments may be possible. Therefore, the described exemplary embodiments include all alternatives, changes, and modifications within the spirit and scope of the accompanying claims.

As used herein, a term "inferring" or "inference" generally refers to a process of determining or inferring a state of a system, an environment, and/or a user based on observation of one set captured by events and/or data. The inference may be used to identify a specific situation or operation, or may generate probability distribution with respect to, for example, states. The inference may be probabilistic, that is, may be calculation of probability distribution with respect to corresponding states based on consideration of data and events. The inference may also refer to technologies used to configure upper level events from one set of events and/or data. Such inference enables estimation of new events or operations from one set of observed events and/or stored event data, whether events are closely related in time, and whether events and data come from one or several events and data sources.

What is claimed is:

1. An automatic parking system, comprising:
   a camera processor configured to generate external images by acquiring images around a subject vehicle;
   a parking space recognizing unit configured to periodically receive the external images and sequentially compare the consecutive external images to detect parking areas; and
   a controller configured to select a first parking area for parking the subject vehicle among the detected parking areas, calculate a moving path between a current position of the subject vehicle and the first parking area and operate the subject vehicle based on the moving path to automatically park in the first parking area,
   wherein the parking space recognizing unit is configured to detect the parking areas based on a length and a width of the subject vehicle.

2. The automatic parking system of claim 1, wherein the parking space recognizing unit is configured to extract feature points of the consecutive images, match the feature points of the two consecutive images, delete mismatched feature points, and match valid feature points to recognize the parking areas.

3. The automatic parking system of claim 2, wherein the sensor processor is configured to sense spaced distances between the surrounding vehicles positioned at a side of the subject vehicle in the first parking area, and the controller is configured to operate the subject vehicle to adjust a spaced distance from the surrounding vehicles positioned at a side of the subject vehicle to be a predetermined reference distance based on the space distances.

4. The automatic parking system of claim 2, wherein the sensor processor is configured to sense spaced distances between the surrounding vehicles positioned at a side of the subject vehicle in the first parking area, and the controller is configured to operate the subject vehicle to adjust a first spaced distance from the surrounding vehicles positioned at a side of the subject vehicle a passenger seat side vehicle positioned on a passenger seat side of the subject vehicle to be a predetermined reference distance based on the space distances.

5. The automatic parking system of claim 4, wherein the controller is configured to adjust the first spaced distance to be the reference distance when the first spaced distance is less than the reference distance and determine whether a second spaced distance between the subject vehicle and a driver's seat side vehicle positioned on the driver's seat of the subject vehicle is equal to or greater than the reference distance.

6. The automatic parking system of claim 1, wherein the automatic parking system further comprises:
   a sensor processor configured to measure spaced distances between the subject vehicle and surrounding vehicles, and the parking space recognizing unit is configured to receive the spaced distances and to recognize parking areas based on the spaced distance and a result of the comparing of the consecutive external images.

7. The automatic parking system of claim 1, wherein the parking space recognizing unit is configured to start operating in response to an input from a driver seated in the subject vehicle.

8. The automatic parking system of claim 1, wherein the parking space recognizing unit is configured to start operating in response to an input from a remote controller of a driver outside the subject vehicle.

9. The automatic parking system of claim 1, wherein the controller is configured to calculate the moving path between the current position and the first parking area selected by the driver among the parking areas.

10. The automatic parking system of claim 1, wherein the controller is configured to calculate the first parking space among the parking areas, and the first parking space has a length and a width dependent on the length and the width of the subject vehicle.

11. The automatic parking system of claim 10, wherein the length of the first parking space is value obtained by adding a first room and the width of the subject vehicle, the first room being based on the width of the subject vehicle for a parallel parking mode.

12. The automatic parking system of claim 1, further comprising:
   a display controller configured to output a notification to a driver regarding the parking areas,
   wherein the controller is configured to operate the subject vehicle to be driven in the first parking area selected by the driver.

13. The automatic parking system of claim 1, wherein the controller is configured to adjust steering, acceleration, brake, gear shift, and parking brake of the subject vehicle.

14. An automatic parking method for automatically parking a subject vehicle, comprising:
  detecting, by a controller, parking areas using external images around the subject vehicle and a length and a width of the subject vehicle;
  selecting, by the controller, a first parking area for parking the subject vehicle among the parking areas; and
  automatically parking, by the controller, the subject vehicle in the first parking area,
  wherein in the detecting of the parking areas, the parking areas are recognized by sequentially comparing the consecutive external images.

15. The automatic parking method of claim 14, further comprising:
  stopping, by the controller, the automatic parking mode, in response to at least one of a turning off of an automatic parking mode switch, shifting a gear, a change of steering, and a break operation during the automatic parking mode.

16. The automatic parking method of claim 14, wherein the detecting of the parking areas includes:
  extracting, by the controller, feature points of the consecutive images using the image recognition technology;
  deleting, by the controller, mismatched feature points by matching the feature points of the two consecutive images; and
  matching, by the controller, images based on valid feature points.

17. The automatic parking method of claim 14, further comprising:
  receiving, by the controller, an input to start detecting the parking space by the controller from a driver seated in the subject vehicle.

18. The automatic parking method of claim 14, further comprising:
  receiving, by the controller, an input to start detecting the parking space by the controller from a remote controller of a driver outside the subject vehicle.

19. The automatic parking method of claim 14, wherein the detecting of the parking areas includes:
  detecting, by the controller, the parking areas based on spaced distances between the subject vehicle and surrounding vehicles and a result of the comparing of the consecutive external images.

* * * * *